United States Patent Office 3,276,857
Patented Oct. 4, 1966

3,276,857
SLOW RELEASE FERTILIZER COMPOSITION CONSISTING OF ASPHALT WAX BINDER AND INERT FILLER
Robert L. Stansbury, Littleton, Colo., and Charles S. Lynch, Lebanon, and Kamil Sor, Linden, N.J., assignors to Esso Research and Engineering Company, a corporation of Delaware
No Drawing. Filed Oct. 5, 1964, Ser. No. 401,672
8 Claims. (Cl. 71—64)

This application is a continuation-in-part of Serial No. 192,084, filed May 3, 1962, now abandoned.

The present invention relates to fertilizer compositions and to an improved method for their manufacture. It pertains more particularly to making a pelleted or compressed fertilizer composition, including a minor proportion of a binder to reduce the rate of aqueous solution and leaching of the more soluble ingredients of the fertilizer. In addition, the compositions of this invention include supplementary barrier materials in addition to the binder, such as waterproofing or water-insoluble ingredients.

Various attempts have been made in the prior art to reduce the water-solubility and leaching rate of inorganic fertilizer materials without rendering the fertilizers incapable of assimilation in growing plants. It has been suggested that particles may be coated exteriorly or mixed with water repellent compositions, etc. According to the present invention, the fertilizer composition is composited of the usual inorganic fertilizing elements such as water-soluble compounds of potassium, phosphorus and nitrogen, to which are added water repellent materials and supplementary moisture retardants such as water-insoluble or insoluble-barrier type materials.

The problem facing the prior art has been the production of a fertilizer which would slowly release its ingredients to the soil over a prolonged period of time. Various methods have been attempted in order to attain that end. One method known to the art has been coating prills or granules of fertilizer with a thin coating of a water-insoluble material so that the coated fertilizer might lie upon or in the soil for a prolonged period before the coating would be eroded and the fertilizer released to the soil. In another method known to the art, particles of nutrients, such as trace elements, were distributed throughout a major portion of water-insoluble binders such as waxes and resins. The effect of this was to form a composition which resembled peanut brittle wherein the peanuts represented the nutrient particles and the caramel represented the binder. Such a procedure would effect deposition of only small amounts of nutrient per unit weight of the total composition; and such effect might be appropriate for supplying trace-elements, but not for controlled release of fertilizers as explained more fully below.

The present invention is carried out by combining together or co-mixing the necessary ingredients and forming the mixture into firm and dense, water-resistant pills, pellets or briquettes. The composition is preferably formed by first mixing powder or discrete granules of appropriate size, for example, fine enough to pass No. 6 U.S. sieve, or such as are found in standard, commercial, mixed inorganic fertilizers, with only sufficient proportions of water-repellent binder material, so as to coat the individual grains or granules with a thin but essentially complete and uniform coating. Additional materials are then incorporated or co-mixed with the coated or partially coated granules, after which the total mixture is compressed or otherwise compacted into dense, non-porous pellets of larger size than the original granules. Various hydrocarbon binder materials may be used such as heavy petroleum residues, asphalts, waxes, blends of these materials, and/or synthetic thermoplastic materials such as various polymers. These may be heated to liquefy them while mixing is accomplished, or they may be dissolved in low boiling solvents which will evaporate to leave the binder in place on the granules. Prior to compression or compaction, however, additional finely divided material is added to further reduce the rate of leaching when excess quantities of water come into contact with the fertilizer. Suitable materials for this purpose may be water-insoluble inorganic materials or minerals such as calcium carbonate, chalk, finely divided limestone rock, calcined lime, gypsum, crushed phosphate rock which has not been acid treated to make its phosphorus ingredients available to plants, and the like. In addition to these inorganic materials, supplementary quantities of organic substances such as the heavy hydrocarbons and polymeric materials mentioned above may be blended.

It is an object of this invention to provide fertilizer compositions which contain at least 75% and preferably 90% of fertilizer ingredient.

It is an object of this invention to provide a compressed fertilizer composition wherein the fertilizer particles are uniformly coated with the least possible amount of binder material, such as asphalt and/or wax.

It is another object of this invention to provide a highly compressed fertilizer composition.

It is an object of this invention to provide a fertilizer composition containing a plurality of discrete fertilizer particles bound together so that no fertilizer particle shall be exposed uncoated at the surface of the composition.

It is an object of the present invention to provide a fertilizer composition which is not tacky and resists caking when stored.

It is known in the prior art to prevent caking of prills or granules of deliquescent fertilizers, e.g. amonium nitrate, by dusting them with powdered kieselguhr. In contradistinction, it is an object of the present invention to form into hard little cakes or pellets a water-soluble fertilizer, e.g. urea which in particulate form has been coated with a hydrocarbon binder and mixed with a powdered mineral, e.g. chalk, by subjecting the mixture to compression at a moderate temperature. When the shaped compositions of the present invention are heated as high as 250° F. during their manufacture, the resistance of the fertilizer composition to leaching by water is impaired significantly.

The present invention is directed to a process of producing a compressed pellet (pill or briquette) of a slow release fertilizer which has improved storage properties. The process of this invention in a preferred embodiment comprises the steps of: (1) intimately mixing 85–95 wt. percent of finely divided fertilizer with respectively from 15–5 wt. percent of a molten binder so as to coat the fertilizer to get a granular, moderately sticky mixture, the mixing of the binder and fertilizer being conducted at a temperature of between 155–230° F.; (2) intimately mixing 98–90 wt. percent of the fertilizer/binder mixture with respectively 2–10 wt. percent of a powdered, water-insoluble, inorganic material to get a friable and relatively dry mixture; (3) compressing the relatively dry mixture of step 2 at a temperature between 155–212° F. into dense dry pills, briquettes or pellets; and (4) intimately mixing 95–98 wt. percent of the pellets of step 3 with respectively 5–2 wt. percent of a molten microcrystalline wax of melting point between 130 and 212° F., at a temperature not exceeding 230° F., so as to coat each pellet as completely and uniformly as possible and allowing the coated pellets to cool. Microcrystalline wax, or microwax is a well-known article of commerce that is manufactured in petroleum refineries by processes for extracting wax from high-boiling distillate or residual lubricating oil fractions of crude oil.

The coating of the pellets with the wax is referred to as wax encapsulation. The encapsulation is dependent on the temperature of the wax and the immersion time of the pellet in the wax. The time of encapsulation must be of sufficient duration to achieve a coating of substantially complete integrity. Depending upon the efficiency of contact between the pellets and the wax, the time may vary from 1 second to 1 hour. With intimate contact by stirring, a time of one minute is usually adequate for encapsulation. The temperature range for the encapsulation step is a temperature between 155° F. and 230° F. It is quite obvious that the temperature must not exceed the decomposition temperature of the fertilizer material being used. Typically, the encapsulation is carried out at 180° F. for a duration of six seconds.

The wax coating on the pellets may be applied either in one step, that is an encapsulation step, or may be applied in a series of steps, that is an encapsulation step followed by one or more recapsulation steps. During the recapsulation steps, less wax is picked up by the pellets than during the encapsulation step. When recapsulating, the pellet, already coated with wax and at about room temperature, is immersed into a bath of molten wax. The bath temperature is maintained above the melting point of the wax, usually at a temperature above about 140° F., e.g. about 175° F. This procedure of recapsulation provides for lower net wax pickup.

As is well known to those skilled in the art, plants tend to utilize fertilizer such as nitrogen at a relatively steady rate. That is, the nitrogen pickup by the plant from the soil, although it varies over a period of time from plant to plant, does not fluctuate over any great range. Therefore, it is important to provide the fertilizer to the plant so that the fertilizer is provided at a substantially continuous rate. The fertilizer compositions of the instant invention have been tested and have been shown fertile at substantially the uptake rate of the plant. For instance, corn has a fertilizer uptake of about 3.8, 5.5 and 4.2% per 100 hours and fertilizers encapsulated according to the instant invention can provide fertilizer at a rate of about 6.3, 6.3 and 3.2% per 100 hours, which substantially conforms with the uptake rate of the corn.

A very important difference between coated fertilizer compositions of the prior art and the compressed fertilizer compositions of the present invention exists in the manner of release of the water-soluble ingredients. As is well known, the protection of a prior art coated granule or prill of water-soluble fertilizer, even if the coating be complete and very thick, lasts only until the first penetration of the coating or shell permits water to enter, whereupon the whole of the enclosed granule is dissolved. A coating, completely applied, delays the moment of release of fertilizer and release is quick at that moment. The rate of release therefore cannot conform with the rate of uptake by a crop.

By contrast, in the compositions of the present invention, the particles, each encased in a thin shell of coating that may be incomplete, are compressed into a dense pellet, in which they are tightly packed one against others. The particles of fertilizer at the surface of the pellet may be exposed to rapid solution, which can be delayed by encapsulation with wax; but the particles in the next inner layer below the surface do not begin to dissolve until the water to which the pellet is exposed has nearly completely dissolved the particles of the outer layer. In this way alone the rate of release of the fertilizer is slower than with a coated fertilizer of the prior art. But there is another phenomenon which slows down the rate of release even further. This is the manner of transfer of the interior fertilizer to the surface of the pellet.

The soluble fertilizer from the inner particles must be transferred to the surface of the pellet in order to become available in the soil to the plants or crop. As each chamber or empty shell, from which a particle has been dissolved, is connected to an adjoining chamber by only a very small opening, a chain of chambers or a channel is formed. Since the source of water for solution and the position for transfer of soluble fertilizer to the soil are both located at the surface end of this channel, while the particle to be dissolved is located at the interior end of the channel, this particle when dissolved moves as a solution by diffusion through the channel. This is a much slower process than the mass flow of solution from the perforation of the coating of a coated prill.

The materials may be formed into pellets by extruding the mixture while tacky or plastic through suitable dies, or by rolling it into small balls or pellets of appropriate size. However, in order to attain dense compositions, with little or no porosity, it is important to apply pressure. Portions from 2 to 25% by weight of binder may be used, preferably 5 to 15% by weight of powdered or granular inorganic fertilizer. To the pellets may be added from 1 to 20% of the inert or filler materials mentioned above, after which the small pellets may be re-pelletized into larger pellets. The invention will be further illustrated by the examples which follow.

*Example 1*

Control over water leaching may be obtained by adding a water-soluble powdered, inorganic solid after mixing an inorganic, water-soluble fertilizer with a binder to form a coating, prior to compaction. Various inorganic filler materials may be used, as long as they are not reactive with or otherwise detrimental to the fertilizer. However, since most soils where fertilizer is employed also need lime, it is preferred to use gypsum or more preferably calcium carbonate. The latter may be added in the form of powdered chalk or as crushed limestone, for instance. This type of dry filler further slows down the rate of diffusion of water into, and of fertilizer solution out of, the composition of the present invention.

Pellets of small ($\frac{1}{16}$-inch) diameter size and of larger ($\frac{3}{8}$-inch) diameter were formed from grains of ammonium sulfate coated with an asphalt-wax binder composition of suitable hardness. An excellent material for this purpose comprises an asphalt of over 120° F., preferably 130° F., softening point combined with a wax, preferably a microcrystalline hydrocarbon wax of fairly high melting point. A 90% asphalt and 10% wax mixture, by weight, is very satisfactory. With the same binder, a mixture of coated ammonium sulfate and 10% by weight of chalk, essentially $CaCO_3$, was similarly pelletized. In the first case, the standard fertilizer granules were mixed with the asphalt-wax blend (9 to 1 weight ratio of asphalt to wax) and in the second, the fertilizer granules were mixed with 10% of the binder plus 10% by weight of powdered chalk. Thereafter they were pelletized by extrusion through suitable dies to form short rod-like particles of smooth surface with a fairly hard and firm structure.

The various pellets, coated and pelletized as just described, were subjected to a severe leaching test by placing 5 grams of fertilizer, as computed on total pellet weight, in a basket and rotating the basket in water until the fertilizer was leached out to the extent of 50% for the larger pellets and of 90% for the small pellets. The degree of leaching was measured by testing the electrical conductivity of the water. The results are tabulated below:

TABLE I

| Pellet Size | Percent of $CaCO_3$ Added | Leaching time, Minutes | Percent Improvement |
|---|---|---|---|
| $\frac{1}{16}$ inch | 0 | 12 | |
| $\frac{1}{16}$ inch | 10 | 16 | 33.3 |
| $\frac{3}{8}$ inch | 0 | 76 | |
| $\frac{3}{8}$ inch | 10 | 156 | 105.2 |

The data show that leaching time was considerably extended, more than double, on the larger pellets and even on the smaller pellets, there was appreciable extension of 33.3% of the time to reach the 90% leaching point.

Obviously, various modifications may be made in the manner of applying the protective binder material and in its composition. Also, the binder may in at least some instances be mixed with the fertilizer by using other expedients than heating, for example, as mentioned above, an evaporable solvent may be used when the binder cannot suitably be melted and applied in liquid form.

It will be understood that several variations in composition may be made, depending on the particular use required and the materials available. In broad terms the composition will normally comprise a substantial proportion of the granular type of fertilizer commonly sold in the agricultural fertilizer industry. As herein used, the term fertilizer is intended to cover the mixed fertilizer composition including compounds of nitrogen, phosphorus and potassium or single compounds of any of the same three elements. To the fertilizer, there may be added the relatively inert mineral filler material in amounts up to 20% but preferably not more than 15% of the weight of the fertilizer material. The binder is employed to bond the whole into pellets substantially larger than the particles of the original fertilizer and of substantially lower water leaching rate, as compared with either the uncoated granules or the coated but uncompacted granules.

The pellets may be die extruded and cut off or broken off while in semi-plastic condition, or they may be rolled up or "snow-balled" by causing movement of smaller masses to pick up coatings of binder, subsequently picking up more granular solids, finely divided inerts, and/or more binder material until the desired pellet size is achieved; but for proper resistance to leaching, it is important to apply pressure. Suitable apparatus for forming either type of pellet, and in fact for forming various shapes, are known and form no part of the present invention. The article of manufacture according to the present invention is formed under a pressure between 45 and 450 pounds per square inch and is at least 1/16 inch in its smallest dimension and at most 2 inches in its greatest dimension.

Instead of adding inert inorganic material, the same general objective can be attained in some degree by encapsulating the pellets of fertilizer and binder alone with supplementary binder material. This may be applied as additional coating on the pellet, or it may be mixed with granular material in building up a pellet from smaller pellets. In the latter application, the added bulk material may be granules of fertilizer or may comprise inert material such as the inorganic water insolubles mentioned above.

Example 2

Using two different binders (A) of straight asphalt, penetration grade 30, softening point 130° F., and (B) a blend of 90% of the same asphalt with 10% of microcrystalline wax of 160° F. melting point, ammonium sulphate was pelletized. In some cases small cylindrical pellets of 1/16-inch diameter were first formed and later made into large cylindrical pellets of 3/8-inch diameter with added binder material and, in some cases, with added fertilizer. These were subjected to accelerated leaching tests in (a) relatively non-porous silt loam soil and (b) relatively porous sandy loam soil with simulated high rainfall conditions, and (c) in a relatively porous soil with very severe, simulated rice culture conditions where water was actually passed through the soil to good subsurface drainage at a rate of one inch of water per day. Under these conditions, the number of 24-hour days required to leach out specified percentages of the fertilizer of the various pellets were determined. The data are tabulated in Table II.

TABLE II.—DAYS REQUIRED TO LEACH AMMONIUM SULPHATE IN VARIOUS PELLETED FORMS FROM SOILS

| Sample No. | Weight percent and Type Binder | Diameter of Pellet | Silt Loam | | | Sandy Loam | | | Rice Culture Conditions (1″ water through soil daily) | | |
|---|---|---|---|---|---|---|---|---|---|---|---|
| | | | 50% | 75% | 90% | 50% | 75% | 90% | 50% | 75% | 90% |
| 59-3 | 5% B | 3/8 inch | 2.8 | 7.0 | | 1.7 | 4.2 | | 0.6 | 1.8 | 6.0 |
| 61-8 | 10% A | 3/8 inch | 3.3 | 12.5 | ⁵30 | 2.6 | ⁵9.0 | ⁵18 | 1.1 | 2.2 | 7.5 |
| 27-2 ¹ | 5% B+3.45% wax | 3/8 inch | 4.6 | 8.5 | | 2.6 | 5.5 | 18.0 | 1.5 | 2.0 | 5.0 |
| 25-1 | 10% B | 1/16 inch | 1.6 | 4.0 | 12.0 | 2.2 | 3.4 | 5.5 | 0.3 | 0.7 | 4.0 |
| 29-2 ² | 14.5% B | 3/8 inch | 9.2 | 30.0 | ⁵59 | 4.0 | 10.0 | ⁵30 | 2.4 | 7.0 | ⁵21 |
| 29-3 ³ | 9.8% B | 3/8 inch | 8.0 | 18.0 | | 2.7 | 4.6 | 19.0 | 1.1 | 2.5 | ⁵13 |
| 29-4 ⁴ | 10.8% B | 3/8 inch | 24.0 | 42.0 | ⁵78 | 4.3 | 11.0 | ⁵31 | 2.8 | 11.5 | ⁵24 |

Notes:
¹ Original 3/8 inch dia. P. of 5% B recoated with 3.45% wax.
² Original 1/16 inch dia. P. of 10% B repelleted into 3/8 inch dia. with the addition of 4.5% B.
³ Original 1/16 inch dia. P. of 10% B repelleted into 3/8 inch dia. with the addition of about 50% fresh blend of binder and fertilizer i.e., to 100 parts of No. 25-1, 45.3 parts of fertilizer and 4.7 parts of binder B.
⁴ Same as (³) except that an additional 2% wax coat was put on the original 1/16 inch, 10% B pellets of Sample No. 25-1.
⁵ By extrapolation.

It is clear that the limestone, chalk, or equivalent mentioned above can be incorporated in the mixes of the materials of Table II further to improve the leaching characteristics of the fertilizer as demonstrated in Table I.

Comparison of Sample No. 27-2 with Sample No. 59-3 shows the advantage of encapsulating a pellet of 3/8-inch diameter with 3.45% wax. Comparison of No. 25-1 with No. 59-3 shows that by increasing the proportion of binder from 5% to 10% by weight, the leaching resistance of a pellet on 1/16-inch diameter is improved to approximate that of a pellet of 3/8-inch diameter.

Next, comparison of No. 29-2 with No. 25-1 shows that by repelleting the already improved small pellet of 1/16-inch diameter into a larger pellet of 3/8-inch diameter with an added small proportion of the same binder, the resistance to leaching is extraordinarily increased manyfold. Comparison of No. 29-3 with No. 29-2 shows a similar but not as great improvement when the repelleting is done with an added minor proportion of mixture of fertilizer and binder. Superior results are obtained when the repelleting is done with an added minor proportion of a mixture of filler and binder.

Finally, comparison of No. 29-4 with No. 29-3 shows the best results were obtained by encapsulating the repelleted pellets with as little as 2% wax.

The foregoing examples for purposes of illustration were carried out with particles of ammonium sulfate of approximately 20 mesh, as the fertilizer for the composition of the present invention. Particles of fertilizer may range from 10 mesh to 200 mesh for the purpose of this invention. Any normally solid inorganic fertilizer except ammonium nitrate can be used in accordance with the present invention. Ammonium nitrate is objectionable because it forms a sensitive explosive when mixed with hydrocarbons. Suitable fertilizers used alone or in mixtures include ammonium sulfate, ammonium carbonate, monoammonium phosphate, diammonium phosphate, guanidine, calcium cyanamid, urea, potash, muriate of potash, calcium nitrate, sulfate of potash, potassium phosphate, potassium metaphosphate, ammoniated superphosphate and triple superphosphate. Urea is a particularly suitable fertilizer of the water-soluble nitrogenous type for use in accordance with the present invention.

As mentioned above, the compositions of the present invention are not heated above 230° F. at any time. When formed by extrusion through dies into cylindrical rods at least 1/16 and at most 1/2 inch in diameter, the rods are cut into lengths between 3/16 inch for the smallest diameter and 2 inches for the largest diameter; but the compositions are not otherwise broken up or comminuted in any way. The compositions prior to being coated or encapsulated comprise at least 76% by weight and preferably at least 90% by weight of active, water-soluble, inorganic fertilizer particles no larger than 10 mesh. After encapsulation, the proportion of said fertilizer particles is at least 75% and preferably at least 85% by weight of the finished article of manufacture.

The binder and the encapsulating material may both be wax with melting point between 130° F. and 175° F. The binder is a thermoplastic hydrocarbon composition with melting point between 120° F. and 220° F., for example, asphalt, wax, or mixtures of asphalt and wax, alone or modified for plasticity or for melting point with hydrocarbon polymers or petroleum resins. The preferred binder is a blend of asphalt and wax, preferably in proportions between 10/1 and 4/1. In preparing the composition of the present invention, preferably 85 to 95 parts of the inorganic fertilizer are coated by being contacted intimately with respectively 15 to 5 parts of molten binder at a temperature not exceeding 230° F. This mixture may be compressed into pellets by extrusion or stamping under pressure and the pellets then encapsulated by being sprayed or otherwise mixed intimately with 2 to 5% of wax with melting point above 130° F. and molten at a temperature about 180° F.

In a prefered embodiment of the present invention, the mixture of coated fertilizer particles, prior to compaction is intimately mixed with from 10% to 2% of relatively inert filler, preferably powdered calcium carbonate in the form of chalk, limestone, dolomite or calcined lime. In this embodiment, the compositions of the present invention range in proportions of fertilizer/binder/filler, from 76.5/13.5/10 to 93.1/4.9/2. These compositions in compressed shapes, when encapsulated with from 2 to 5% wax, then comprise the same three ingredients in proportions between 75/13.2/9.8 and 88.4/4.7/1.9. In round numbers, the range of proportions may be stated as 75/13/10/2 to 88/5/2/5 of fertilizer/binder/filler/wax.

What is claimed is:

1. A dense, slow release pelletized fertilizer composition which is substantially non-tacky and cake-resistant when stored, said composition comprising a major proportion of water-soluble inorganic fertilizer particles and minor proportions of (a) a substantially inert filler and (b) a water repellent hydrocarbon binder; said particles being at least partially coated with a thin film of said binder; and said filler being distributed throughout said composition so as to improve the leaching resistance of said composition.

2. A composition as defined by claim 1 wherein the fertilizer is ammonium sulfate.

3. A composition as defined by claim 1 wherein said filler is calcium carbonate.

4. A composition as defined by claim 1 wherein said binder is a mixture of wax and asphalt.

5. The composition defined by claim 1 encapsulated with microcrystalline wax.

6. A dense, slow release pelletized fertilizer composition consisting essentially of (a) at least 75 wt. percent of water-soluble inorganic fertilizer particles, (b) about 1 to 20 wt. percent of a substantially inert filler and (c) about 1 to 25 wt. percent of a water repellent hydrocarbon binder; said particles being at least partially coated with a thin film of said binder; and said filler being distributed throughout said composition so as to improve the leaching resistance of said composition.

7. A process for making a dense slow release pelletized fertilizer composition comprising the steps of (a) intimately mixing at a temperature of about 155 to 230° F., water-soluble inorganic fertilizer particles and a water repellent hydrocarbon binder so as to substantially coat said particles with said binder, thereby producing a friable, granular and moderately sticky mixture; (b) intimately mixing the mixture of step (a) with sufficient substantially inert filler to produce a friable, granular and relatively dry mixture; (c) compressing said dry mixture of step (b), under relatively high pressure and at a temperature of about 155 to 212° F., into hard, dense pellets, thereby producing a non-sticky, non-tacky, fertilizer composition.

8. A process as defined by claim 7 wherein said hard, dense pellets produced at step (c) are encapsulated in step (d) by substantially coating said pellets with microcrystalline wax.

References Cited by the Examiner

UNITED STATES PATENTS

| 2,008,469 | 7/1935 | Prince | 71—9 |
| 2,714,062 | 7/1955 | Lockrey et al. | 71—30 |
| 2,792,295 | 5/1957 | Wright | 71—64 |
| 2,912,317 | 11/1959 | Gloss | 71—64 |
| 2,936,226 | 5/1960 | Kaufman et al. | 71—1 |
| 3,014,783 | 12/1961 | Young | 71—64 |
| 3,024,098 | 3/1962 | Austin et al | 71—64 |
| 3,085,870 | 4/1963 | Bradford et al. | 71—28 |

DONALL H SYLVESTER, *Primary Examiner.*

ANTHONY SCIAMANNA, *Examiner*

G. W. RUTHERFORD, *Assistant Examiner.*